(12) United States Patent
Jeong et al.

(10) Patent No.: US 10,745,306 B2
(45) Date of Patent: Aug. 18, 2020

(54) AQUIFER STORAGE AND RECOVERY SYSTEM INCLUDING AEROBIC REACTOR USING MICROBES FROM UNDERGROUND AQUIFER

(71) Applicant: KOREA INSTITUTE OF SCIENCE AND TECHNOLOGY, Seoul (KR)

(72) Inventors: Seong Pil Jeong, Seoul (KR); Jae Woo Choi, Seoul (KR); Kyungjin Cho, Seoul (KR); Hien Thi Nguyen, Seoul (KR); Youngjae Kim, Seoul (KR); Am Jang, Seoul (KR); Seunghak Lee, Seoul (KR); Seockheon Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/390,007

(22) Filed: Apr. 22, 2019

(65) Prior Publication Data
US 2020/0207649 A1 Jul. 2, 2020

(30) Foreign Application Priority Data
Jan. 2, 2019 (KR) ........................ 10-2019-0000126

(51) Int. Cl.
| | | |
|---|---|---|
| *C02F 3/04* | (2006.01) | |
| *E03B 3/06* | (2006.01) | |
| *C02F 1/00* | (2006.01) | |
| *C02F 3/34* | (2006.01) | |
| *E03B 3/34* | (2006.01) | |

(52) U.S. Cl.
CPC ............. *C02F 3/046* (2013.01); *C02F 1/001* (2013.01); *C02F 3/34* (2013.01); *E03B 3/06* (2013.01); *E03B 3/34* (2013.01); *C02F 2201/002* (2013.01)

(58) Field of Classification Search
CPC .. C02F 3/046; C02F 3/34; C02F 1/001; C02F 2201/002; C02F 1/52; E03B 3/06; E03B 3/34
USPC .......................................... 210/150
See application file for complete search history.

(56) References Cited

U.S. PATENT DOCUMENTS

| | | | | |
|---|---|---|---|---|
| 5,518,620 A | * | 5/1996 | Eguchi ..................... | B01J 19/32 210/150 |
| 7,081,203 B2 | * | 7/2006 | Helm ........................ | C02F 3/06 210/150 |
| 7,731,850 B2 | | 6/2010 | Choi et al. | |

(Continued)

FOREIGN PATENT DOCUMENTS

| | | |
|---|---|---|
| JP | 2001232384 A | 8/2001 |
| JP | 200295496 A | 4/2002 |

(Continued)

OTHER PUBLICATIONS

Korean Office Action for KR Application No. 10-2019-0000126 dated Jun. 5, 2020, citing the above reference(s).

*Primary Examiner* — Nam X Nguyen
*Assistant Examiner* — Julia L. Wun
(74) *Attorney, Agent, or Firm* — Cantor Colburn LLP

(57) ABSTRACT

Provided is an aquifer storage and recovery system, in which microbes extracted from an underground aquifer are involved in an assimilable organic carbon (AOC) removal mechanism and applied to an aerobic reactor, and a predetermined portion of assimilable organic carbon in raw water is removed through the aerobic reactor.

8 Claims, 3 Drawing Sheets

(56) References Cited

U.S. PATENT DOCUMENTS

| | | | |
|---|---|---|---|
| 7,967,989 B2* | 6/2011 | Gong | B09C 1/00 |
| | | | 210/696 |
| 8,097,168 B2* | 1/2012 | Theodore | A01G 33/00 |
| | | | 210/724 |
| 8,388,833 B2* | 3/2013 | Robertson | C02F 3/301 |
| | | | 210/143 |

FOREIGN PATENT DOCUMENTS

| | | |
|---|---|---|
| KR | 2019990008964 U | 3/1999 |
| KR | 1020000034519 A | 6/2000 |
| KR | 100703890 B1 | 4/2007 |
| KR | 100915541 B1 | 9/2009 |
| KR | 1020110088481 A | 8/2011 |
| KR | 1020120093610 A | 8/2012 |
| KR | 101334266 B1 | 11/2013 |
| KR | 1020170071932 A | 6/2017 |
| KR | 101837300 B1 | 3/2018 |

* cited by examiner

AQUIFER STORAGE AND RECOVERY SYSTEM INCLUDING AEROBIC REACTOR USING MICROBES FROM UNDERGROUND AQUIFER

CROSS-REFERENCE TO RELATED APPLICATION

This application claims priority to Korean Patent Application No. 10-2019-0000126, filed on Jan. 2, 2019, and all the benefits accruing therefrom under 35 U.S.C. § 119, the contents of which in its entirety are herein incorporated by reference.

BACKGROUND

1. Field

The present disclosure relates to an aquifer storage and recovery system including an aerobic reactor using microbes from an underground aquifer, and more particularly, to an aquifer storage and recovery system including an aerobic reactor using microbes from an underground aquifer, in which the microbes from the underground aquifer involved in the assimilable organic carbon (AOC) removal mechanism of the aquifer storage and recovery process is applied to an aerobic reactor, and a predetermined portion of assimilable organic carbon in raw water is removed through the aerobic reactor, thereby reducing the time required to purify raw water by the aquifer storage and recovery process.

2. Description of the Related Art

Aquifer storage and recovery injects rainwater, surface water or sewage treated water into an underground aquifer, and if necessary, recovers and uses it, and can be used to supplement dry season water supplies and improve water quality by removing pollutants during long-term storage.

Aquifer storage and recovery has been used in Europe, USA, Singapore, etc., and may be largely classified into two applications accordingly to the purpose. First, in the case of European regions, aquifer storage and recovery is used as a pre-treatment process of a water purification process. In particular, it is known in the Netherlands that assimilable organic carbon (AOC) which can be utilized by microbes is reduced to 10 μg/L or less while raw water injected is stored in the underground aquifer in the long term. In such a case, it is generally known that during transport to each source of supply after a water purification process including a disinfection process, a phenomenon of microbial regrowth in plumbing does not occur, and thus there is no need for chemical disinfection such as chlorination. If the disinfection process is excluded from the water purification process, it is possible to achieve great cost savings and prevent disinfection by-products (DBPs) from being produced during disinfection, thereby providing safe drinking water. In the case of USA or Singapore, recycled water produced by advanced treatment for the purpose of wastewater reuse is stored in the underground aquifer for a predetermined period of time and then supplied to each demand as potable water through a polishing process.

As described above, aquifer storage and recovery stores various types of injected raw water in the underground aquifer, thereby increasing space utilization above the ground, and reducing a loss of water resources caused by evaporation. Additionally, recently, it is known that it is possible to remove micropollutants when stored in the long term. However, techniques are used to maintain assimilable organic carbon at a proper level through a costly pre-treatment process before injection. Along with this, aquifer storage and recovery is effective in removing assimilable organic carbon, but it should be considered that a long-term storage for a few months or longer is required.

RELATED LITERATURES

Patent Literatures (Patent Literature 1) Korean Patent No. 1334266

SUMMARY

The present disclosure is designed to solve the problems such as those described above, and therefore the present disclosure is directed to providing an aquifer storage and recovery system including an aerobic reactor using microbes from an underground aquifer, in which the microbes from the underground aquifer involved in the assimilable organic carbon (AOC) removal mechanism of the aquifer storage and recovery process is applied to an aerobic reactor, and a predetermined portion of assimilable organic carbon in raw water is removed through the aerobic reactor, thereby reducing the time required to purify raw water by the aquifer storage and recovery process.

An aquifer storage and recovery system including an aerobic reactor using microbes from an underground aquifer disclosed herein includes a raw water tank which stores raw water, an aerobic reactor which removes assimilable organic carbon (AOC) and organic matter contained in the raw water through aerobic reaction using the microbes from the underground aquifer, and an aquifer storage and recovery tank which is supplied with the raw water having gone through the aerobic reactor and produces reclaimed water through an aquifer storage and recovery process.

The microbes from the underground aquifer may be aerobic microbes that decompose assimilable organic carbon (AOC) in water, and may be microbes extracted from an underground aquifer, or microbes extracted from soil that constitutes the aquifer storage and recovery tank.

The aerobic reactor may include an adsorbent, and the microbes from the underground aquifer may be attached to and grow on the adsorbent. The adsorbent may include activated carbon or sand, the adsorbent may be activated carbon or sand attached to a flat plate or a mesh, and the adsorbent may be repeatedly placed in a vertical direction at a predetermined interval on a bottom of the aerobic reactor.

The aquifer storage and recovery system including an aerobic reactor using microbes from the underground aquifer may further include an air diffuser on one side of the aerobic reactor to supply air.

A coagulant separation apparatus may be provided on one side of the aquifer storage and recovery tank to separate a metal ion derived from a permeable layer of the aquifer storage and recovery tank or a soil derived coagulant, a coagulation reactor may be provided at a front or rear end of the aerobic reactor, the soil derived coagulant contained in the reclaimed water of the aquifer storage and recovery tank may be concentrated and separated by the coagulant separation apparatus and supplied to the coagulation reactor, and the coagulation reactor may coagulate and remove the assimilable organic carbon (AOC) and the organic matter by using the soil derived coagulant.

The aquifer storage and recovery system including an aerobic reactor using microbes from the underground aquifer disclosed herein has the following effects.

Microbes involved in the assimilable organic carbon (AOC) removal mechanism are extracted from the underground aquifer, and aerobic reaction is pre-performed on raw water by using the microbes from the underground aquifer, thereby significantly reducing the time required for the aquifer storage and recovery process to remove assimilable organic carbon (AOC).

DETAILED DESCRIPTION

Technology that may effectively remove assimilable organic carbon (AOC) and other organic matter in raw water using aquifer storage and recovery is proposed herein.

As mentioned above in the 'Related art', when raw water spends a long time using aquifer storage and recovery, the concentration of assimilable organic carbon (AOC) in raw water is reduced. However, a very long residence time is required, and the residence time may be prolonged according to the characteristics of raw water.

Purification of raw water using aquifer storage and recovery is proposed, in which microbes from an underground aquifer involved in the assimilable organic carbon (AOC) removal mechanism of the aquifer storage and recovery process is applied to an aerobic reactor, and a predetermined portion of assimilable organic carbon in raw water is pre-removed through the aerobic reactor, thereby reducing the time required to purify raw water by the aquifer storage and recovery process.

Hereinafter, an aquifer storage and recovery system including an aerobic reactor using microbes from the underground aquifer according to an embodiment of the present disclosure will be described in detail with reference to the accompanying drawings.

Figure 1:
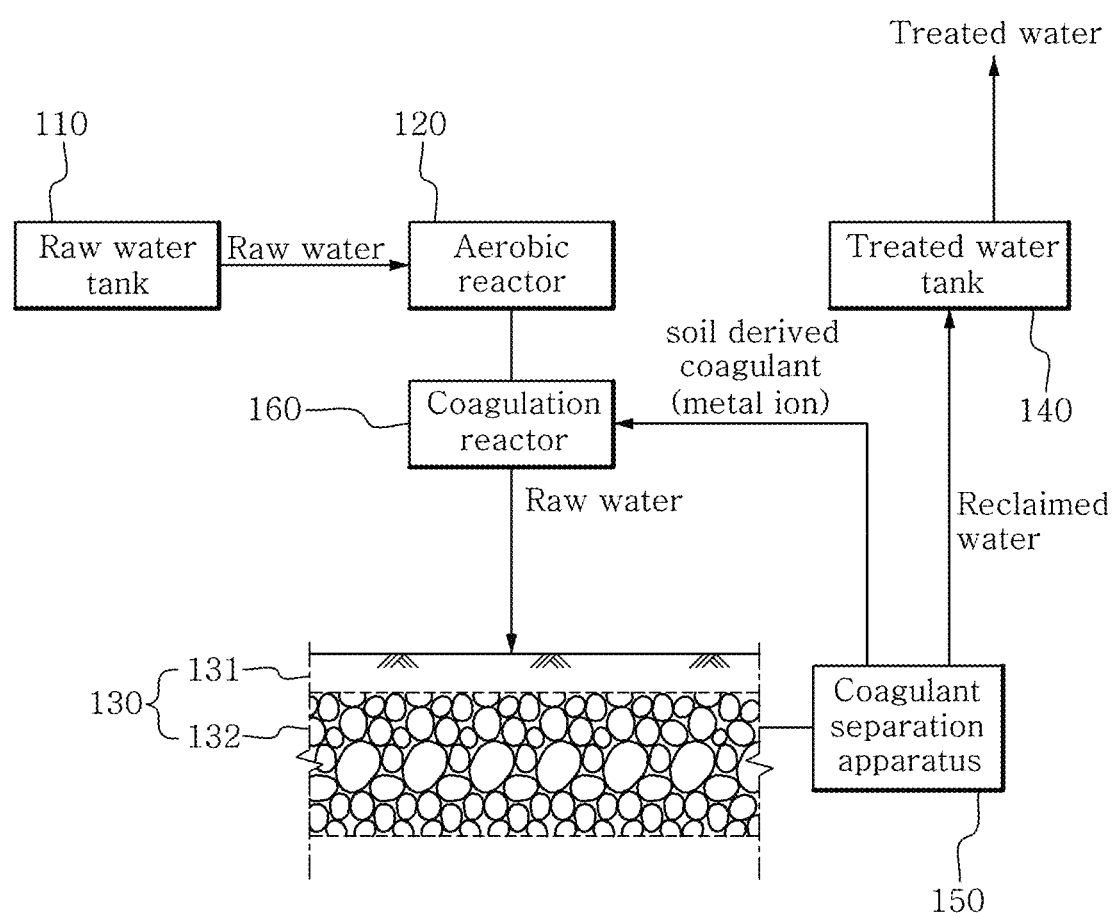
FIG. 1 is an architecture diagram of an aquifer storage and recovery system including an aerobic reactor using microbes from an underground aquifer according to an embodiment of the present disclosure.

Referring to FIG. 1, the aquifer storage and recovery system including an aerobic reactor using microbes from the underground aquifer according to an embodiment of the present disclosure includes a raw water tank 110, an aerobic reactor 120, an aquifer storage and recovery tank 130 and a treated water tank 140.

The raw water tank 110 stores raw water therein, and the raw water may be any one of surface water, rainwater, freshwater containing pollutants and advanced treated wastewater, or their mixtures.

The aerobic reactor 120 serves to remove assimilable organic carbon (AOC) and other organic matter contained in raw water through aerobic reaction using microbes from the underground aquifer. The aerobic reactor 120 includes an adsorbent where microbes from the underground aquifer are attached and grow. Additionally, an air diffuser is provided on one side of the aerobic reactor 120 to supply air. The upper surface of the aerobic reactor 120 may be exposed to air, and in this case, an air diffuser is not required.

The microbes from the underground aquifer, which are attached to and grow on the adsorbent of the aerobic reactor 120, are extracted from an underground aquifer 132 to which the aquifer storage and recovery system according to the present disclosure is applied, and they refer to aerobic microbes that decompose assimilable organic carbon (AOC) in water. In an embodiment, the microbes from the underground aquifer may identify the species *Pseudomonas Jinjuensis*, and considering that water passes through soil and is stored in the underground aquifer 132, the microbes from the underground aquifer may be extracted from soil in the upper part of the underground aquifer 132.

Figure 2:
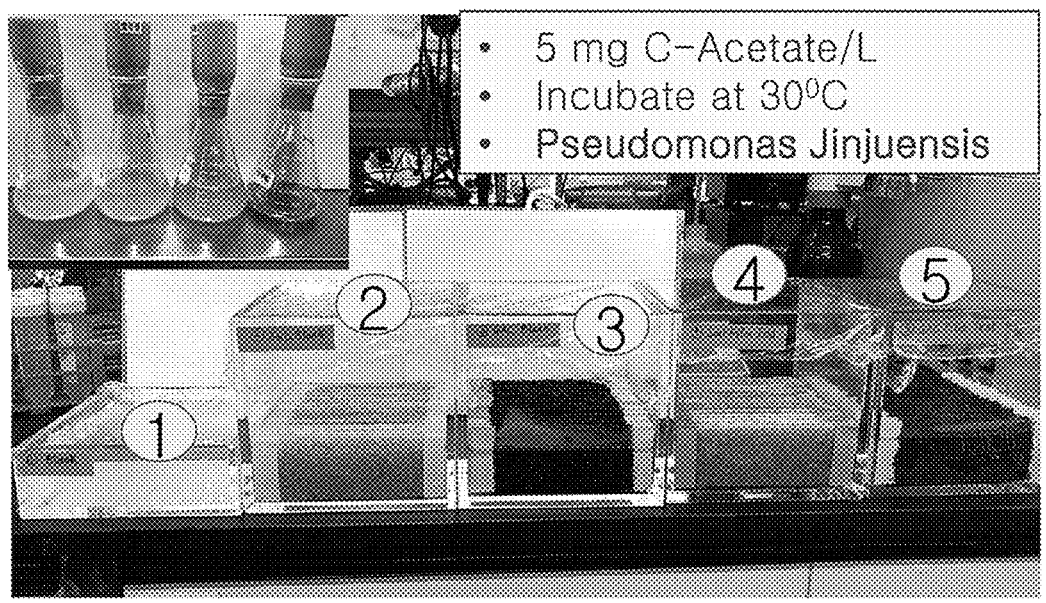
FIG. 2 is a photographic image showing an aerobic reactor with an adsorbent according to an embodiment of the present disclosure.

The adsorbent may use activated carbon or sand, and in an embodiment, activated carbon or sand may be attached to a flat plate or a mesh to generate an adsorbent, and the corresponding adsorbent may be placed in a vertical direction at a predetermined interval on the bottom of the aerobic reactor 120 (see ②-⑤) in FIG. 2).

Under this configuration, when raw water in the raw water tank 110 is introduced into the aerobic reactor 120, the adsorbent of the aerobic reactor 120 adsorbs organic matter in the raw water, and along with this, the microbes from the underground aquifer, which are attached to and grow on the adsorbent, decompose assimilable organic carbon (AOC) contained in the raw water. The raw water having gone through aerobic reaction of the aerobic reactor 120 moves to the underground aquifer 132 storage and recovery tank.

The aquifer storage and recovery tank 130 serves to produce reclaimed water through the aquifer storage and recovery process. The aquifer storage and recovery tank 130 may use a common aquifer storage and recovery system. In an embodiment, the aquifer storage and recovery tank 130 may include a combination of a permeable layer 131 and the underground aquifer 132. The aquifer storage and recovery process allows the raw water having gone through the aerobic reactor 120 to be stored in the underground aquifer 132 through the permeable layer 131, and the organic matter contained in the raw water are filtered off by the permeable layer 131 while the raw water passes through the permeable layer 131.

The reclaimed water treated by the aquifer storage and recovery tank 130 moves to the treated water tank 140, and although not shown in the drawings, a borehole and a pump are provided on one side of the aquifer storage and recovery tank 130 to supply the reclaimed water to the treated water tank 140.

The aquifer storage and recovery system including an aerobic reactor using microbes from the underground aquifer according to an embodiment of the present disclosure has been hereinabove described.

Meanwhile, in addition to the above-described configuration, technology that uses a metal ion produced during aquifer storage and recovery as a coagulant may be added. Fine metal particles of metal present in the permeable layer 131, for example, iron, aluminum, copper, manganese and cobalt are dissolved in the raw water while the raw water passes through the permeable layer 131 of the aquifer storage and recovery tank 130. Accordingly, a metal ion such as an iron ion, an aluminum ion, a copper ion, a manganese ion and a cobalt ion is dissolved in the reclaimed water of the underground aquifer 132, and the metal ion may be used as a soil derived coagulant.

In this case, a coagulant separation apparatus 150 may be provided on one side of the aquifer storage and recovery tank 130 to separate the metal ion derived from the permeable layer 131, namely, the soil derived coagulant, and a coagulation reactor 160 may be provided at the front or rear end of the aerobic reactor 120. The soil derived coagulant contained in the reclaimed water of the aquifer storage and recovery tank 130 is concentrated and separated by the coagulant separation apparatus 150 and supplied to the coagulation reactor 160, and the coagulation reactor 160 coagulates and removes assimilable organic carbon (AOC) and other organic matter using the soil derived coagulant. The coagulation reactor 160 may be a single reactor or a combination of a coagulation and mixing tank and a precipitation tank, and the coagulant separation apparatus 150 may separate the metal ion by precipitation, filtration and evaporation.

Subsequently, the present disclosure will be described in more detail through an experimental example.

Figure 3:
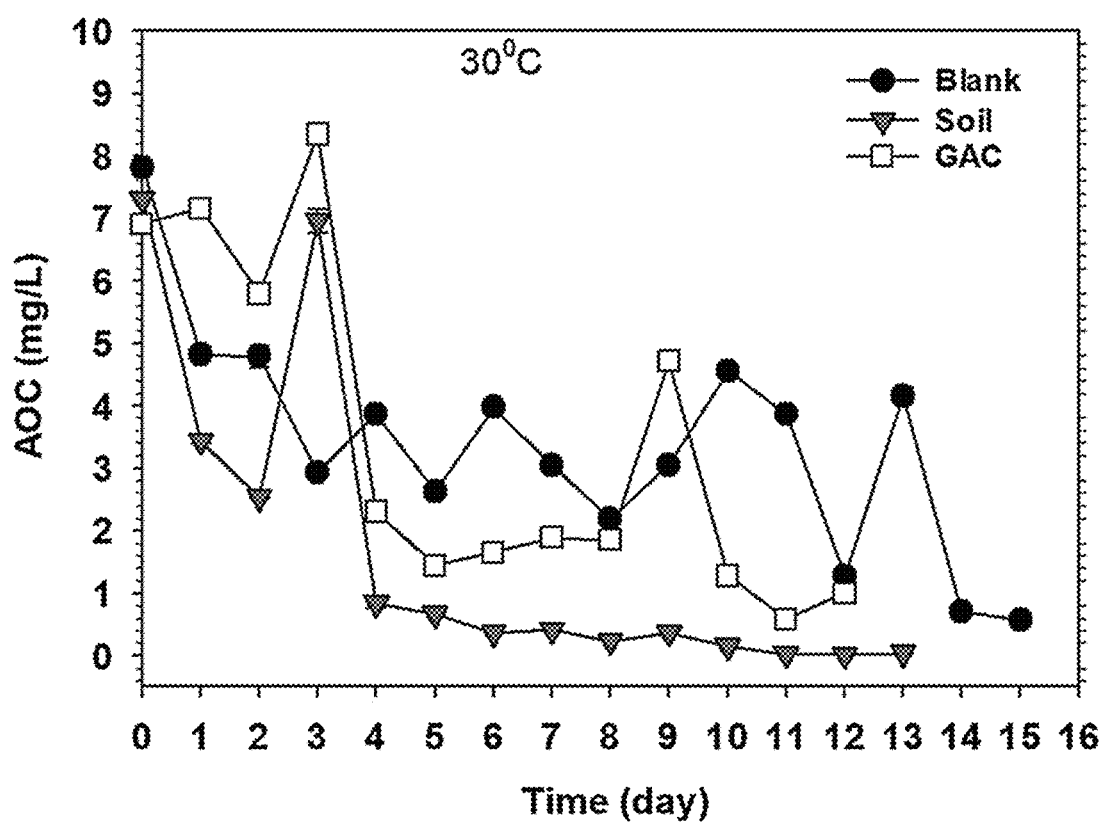
FIG. 3 shows the experimental results showing the assimilable organic carbon removal characteristic of an aquifer storage and recovery system including an aerobic reactor using the microbes from the underground aquifer according to an embodiment of the present disclosure.

FIG. 3 shows the experimental results of assimilable organic carbon removal characteristic of the aquifer storage and recovery system including an aerobic reactor using microbes from the underground aquifer according to an embodiment of the present disclosure. The experiment of FIG. 3 is performed for each of the case in which only microbes from the underground aquifer float in the aerobic reactor (see Blank in FIG. 3), the case in which sand is used for the adsorbent of the aerobic reactor and microbes from the underground aquifer are attached to and grow on the adsorbent (see Soil in FIG. 3), and the case in which activated carbon (GAC) is used for the adsorbent of the aerobic reactor and microbes from the underground aquifer are attached to and grow on the adsorbent (see GAC in FIG. 3). Additionally, for microbes from the underground aquifer, the species *Pseudomonas Jinjuensis* is used, and the concentration of assimilable organic carbon (AOC) in raw water is set to 5 mg/L. As a result of the experiment, it can be seen that the concentration of assimilable organic carbon (AOC) in raw water is reduced to a level that is sufficient for discharge, 20 µg/L or less, before two weeks elapsed as shown in FIG. 3.

DETAILED DESCRIPTION OF MAIN ELEMENTS

110: Raw water tank
120: Aerobic reactor
130: Aquifer storage and recovery tank
131: Permeable layer
132: Underground aquifer
140: Treated water tank
150: Coagulant separation apparatus
160: Coagulation reactor

What is claimed is:

1. An aquifer storage and recovery system, comprising:
a raw water tank which stores raw water;
an aerobic reactor which receives the raw water from the raw water tank and removes assimilable organic carbon (AOC) and organic matter contained in the raw water through aerobic reaction using microbes extracted from an underground aquifer;
an aquifer storage and recovery tank which includes a permeable layer and an underground aquifer, the underground aquifer of which receives the raw water filtered by the aerobic reactor through permeable layer disposed over the underground aquifer, and which produces reclaimed water from the raw water through an aquifer storage and recovery process; and
a treated water tank connected to the aquifer storage and recovery tank for receiving the reclaimed water from the aquifer storage and recovery tank;
a coagulant separation apparatus provided on one side of the aquifer storage and recovery tank and which separates a metal ion from the permeable layer; and
a coagulation reactor provided at a front or rear end of the aerobic reactor;
wherein the metal ion contained in the reclaimed water of the aquifer storage and recovery tank is used as a soil derived coagulant, the coagulant separation apparatus is for concentrating, separating and supplying the soil derived coagulant to the coagulation reactor, and the coagulation reactor coagulates and removes the assimilable organic carbon (AOC) and the organic matter by using the soil derived coagulant.

2. The aquifer storage and recovery system according to claim 1, wherein the microbes extracted from the underground aquifer are aerobic microbes that decompose assimilable organic carbon (AOC) in water.

3. The aquifer storage and recovery system according to claim 1, wherein the microbes extracted from the underground aquifer are aerobic microbes that decompose assimilable organic carbon (AOC) in water, and are microbes extracted from soil that constitutes the underground aquifer of the aquifer storage and recovery tank.

4. The aquifer storage and recovery system according to claim 1, wherein the aerobic reactor includes an adsorbent, and the microbes extracted from the underground aquifer are attached to and grow on the adsorbent.

5. The aquifer storage and recovery system according to claim 4, wherein the adsorbent includes activated carbon or sand.

6. The aquifer storage and recovery system according to claim 4, wherein the adsorbent is activated carbon or sand attached to a flat plate or a mesh, and provided in plural, and each absorbent is placed in a vertical direction at a predetermined interval from an adjacent absorbent on a bottom of the aerobic reactor.

7. The aquifer storage and recovery system according to claim 1, further comprising an air diffuser on one side of the aerobic reactor to supply air.

8. The aquifer storage and recovery system according to claim 1, wherein the microbes extracted from the underground aquifer include *Pseudomonas Jinjuensis*.

* * * * *